United States Patent [19]

Kaneko

[11] Patent Number: 5,075,841

[45] Date of Patent: Dec. 24, 1991

[54] PRINTER CONTROL WITH AUTOMATIC INTIALIZATION OF STORED CONTROL DATA

[75] Inventor: Masahiko Kaneko, Kawagoe, Japan

[73] Assignee: Citizen Watch Co., Ltd., Tokyo, Japan

[21] Appl. No.: 296,716

[22] Filed: Jan. 13, 1989

[30] Foreign Application Priority Data

Jan. 18, 1988 [JP] Japan .................. 63-6891

[51] Int. Cl.$^5$ .................. G06F 13/12; G06F 9/06; G06F 9/24; G06F 3/12
[52] U.S. Cl. .................. 395/575; 364/123.5; 364/244.6; 364/926.9; 364/927.92; 364/975.2; 364/61.0; 364/280.2; 364/284.0; 364/383; 364/384; 364/239.4; 364/350; 364/343; 364/344; 364/DIG. 1; 364/DIG. 2
[58] Field of Search .................. 400/70, 121; 364/519, 364/518, 523, 521, 200 MS File, 900 MS File; 371/24, 25, 26, 67

[56] References Cited

U.S. PATENT DOCUMENTS

| | | | |
|---|---|---|---|
| 4,441,164 | 4/1984 | Pavan et al. | 364/900 |
| 4,494,156 | 1/1985 | Kadison et al. | 360/48 |
| 4,545,011 | 10/1985 | Lyon et al. | 364/200 |
| 4,742,483 | 5/1988 | Morrell | 364/900 |
| 4,763,305 | 8/1988 | Kuo | 365/200 |
| 4,775,931 | 10/1988 | Dickie et al. | 364/200 |

FOREIGN PATENT DOCUMENTS 62-46364 2/1987 Japan .

OTHER PUBLICATIONS

IBM Technical Disclosure Bulletin, vol. 27, No. 12, May 1985 pp. 6887-6890 "Extension Device for a Personel Computer".

Primary Examiner—Archie E. Williams, Jr.
Assistant Examiner—Mehmet Geckil
Attorney, Agent, or Firm—Lowe, Price, LeBlanc and Becker

[57] ABSTRACT

A printer controlled by a CPU in which a ROM having stored therein a control program executed by the CPU in replaceable. The ROM has stored therein identifying codes for identifying the control program stored in the ROM, and initializing data. A nonvolatile memory capable of being read out and written and having contents retained even if a power switch is turned off is provided with memory areas which can store respectively the identifying codes and the initializing data stored in the ROM in an identical array fashion. Each time the power switch is turned on, the identifying codes stored in the ROM are compared with identifying codes stored in the nonvolatile memory. If the identifying codes in the ROM and the identifying codes in the nonvolatile memory are inconsistent with each other, the identifying codes and the initializing data stored in the ROM are transferred and written respectively to the memory areas of the nonvolatile memory.

2 Claims, 3 Drawing Sheets

PRINTER CONTROL WITH AUTOMATIC INTIALIZATION OF STORED CONTROL DATA

BACKGROUND OF THE INVENTION

The present invention relates to a printer provided with an automatic memory initializing function.

A printer is known, which is of type in which a user can select respective initial states of various functions of the printer, after a power switch of the printer has been turned on, but before the actual printing operation is executed. The various functions include the following examples:

(a) Selectively setting an interface between the printer and a host computer or the like to which the printer is connected. For instance, function selectively setting either one of a parallel interface and a serial interface;

(b) Selectively setting a dot-arrangement which determines if characters to be printed are ones for a draft or ones of high quality;

(c) Selectively setting a pitch of characters to be printed;

(d) Selectively setting a pitch of lines to be printed;

(e) Selectively setting a paper length; and (f) Selectively setting nationalityclassified character codes.

The above-described various functions have conventionally been set by multi-bit switches called "DIP", switches. By the way, the functions of the printer have been diversifying increasingly. The following problems arise attendant upon the diversification of the functions. As the number of functions set by the switches increases, the number of the bits of the DIP switch cannot but increase. As a result, the manipulation of the printer has been made troublesome and cumbersome. In addition, a DIP switch having a high bit number is high in cost, rendering the printer per se expensive.

In recent years, a printer having incorporated therein a nonvolatile RAM (random-access memory) in place of the DIP switches has been developed in order to cope with the above-discussed problem. In the printer, various functions are stored in the nonvolatile RAM, and functions of the printer are set on the basis of the stored functions. The functions of the printer can be modified by rewriting the contents of the nonvolatile RAM by manipulation of an operating panel or the like.

There are cases where it is required to initialize the currently used entire areas of the nonvolatile RAM before the use thereof. To this end, the printer is provided with an initializing function. The contents of the memory initialized by the initializing function are called "factory default" conditions.

The cases where it is required to initialize the nonvolatile RAM include the following ones:

(1) Case where a power switch is turned on at the production stage in a factory to cause electric current to first flow through a printed circuit board;

(2) Case just before shipment of the printer produced at the factory;

(3) Case where a user desires to return to "factory default";

(4) Case where the contents in the nonvolatile RAM have been volatilized due to occurrence of any abnormality; and (5) Case where a control unit is replaced by a new one in order to up grade the functions of the printer.

The above case (1) is a case where electric current is caused to pass, for the first time, through the printed circuit board to which components are mounted actually. Since, in this case, the contents of the nonvolatile RAM are undefined, it is necessary to initialize the nonvolatile RAM.

The above case (2) is a case where the contents of the nonvolatile RAM have been rewritten due to delivery adjustment or the like. In this case, it is required to define the stored contents of the nonvolatile RAM at the time of shipment.

The above case where (3) is a case the printer's using environment is altered, such as, for example, a case where a user changes the host computer to which the printer is connected.

In the above case (4), it is a matter of course that the various functions of the printer are required to be set again in the nonvolatile RAM. Accordingly, it is necessary to first initialize the nonvolatile RAM.

The above case (5) is a case where, in a printer controlled by a CPU (central processing unit), a ROM (read-only memory) having stored therein a control program and control codes for the control program is replaced by another one. For instance, a printer, even one which has once been shipped, can be used as a printer upgraded in function, by replacing the currently used ROM with a new one having incorporated therein new functions. Since, in this case, areas within the nonvolatile RAM, which are utilized for the new functions, are ones which have not conventionally been used, the contents of the areas are undefined. Accordingly, when the ROM having stored therein the control codes is replaced by new one, it is necessary to carry out such initializing operation as to transfer initializing data stored in the new ROM to the nonvolatile RAM. Should the printer be operated without of the initializing operation of the nonvolatile RAM, the printer would perform unforeseen operation.

The above-mentioned initialization of the memory is not usually carried out frequently and, accordingly, must not easily be carried out by ordinary users. For this reason, the operation method of the memory initialization is generally made complicated. In case of, for example, an operating panel having four manipulating keys, the memory initialization is carried out by pushing two keys simultaneously. In this manner, the initializing operation per se is made complicated. As a result, there is a high possibility that one forgets the initializing operation. This becomes a problem of the printer of the type in which the functions are set by and stored in the nonvolatile RAM.

SUMMARY OF THE INVENTION

It is an object of the invention to provide a printer in which if a ROM having stored therein control codes is replaced with one having new functions, a nonvolatile memory at once initialized automatically, thereby making it possible to prevent the initialization from being forgotten.

According to the invention, there is provided a printer comprising:

a CPU for controlling various functions of the printer;

a replaceable ROM having stored therein a control program executed by the CPU, first identifying codes for identifying the control program, and first initializing data;

a nonvolatile memory capable of being read out and written and having contents retained even if power switch means of the printer is turned off, the nonvolatile memory being provided with first and second memory areas having respectively stored therein second identifying codes and second initializing data similar respectively to the first identifying codes and the first initializing data stored in the ROM, the first and second memory areas being capable of storing the first identifying codes and the first initializing data, respectively; and a control unit for comparing the first and second identifying codes with each other each time when the power switch means is turned on, to transfer the first identifying codes and the first initializing data respectively to the first and second memory areas of the nonvolatile memory when the first and second identifying codes are inconsistent with each other, thereby writing the first identifying codes and the first initializing data respectively to the first and second memory areas.

As described above, the arrangement of the printer according to the invention is such that even if the ROM having stored therein the control program is replaced by a new one, the nonvolatile memory is initialized automatically. With such arrangement, any no particular operation is required to initialize the nonvolatile memory. Thus, the printer can be prevented from performing unforeseen operation, making it possible to facilitate replacement of the ROM with a new version one.

DETAILED DESCRIPTION

Figure 1:
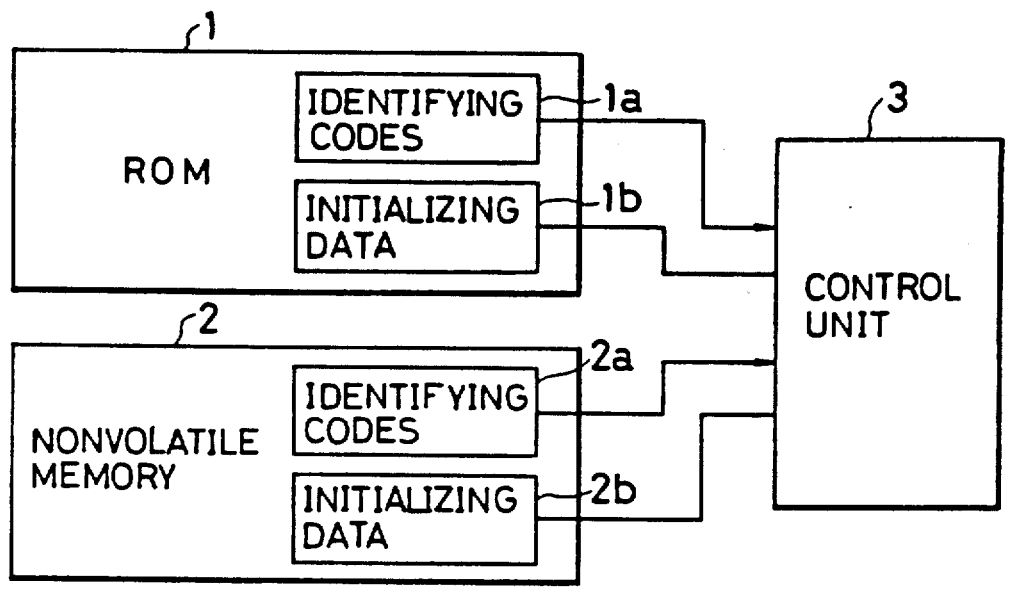
FIG. 1 is a block diagram for explanation of a control system incorporated in a printer according to the invention.

A printer according to the invention will first be described with reference to FIG. 1, prior to description of an embodiment of the invention. The printer according to the invention is so designed as to be controlled by a CPU (central processing unit), in which a ROM (read-only memory) 1, having stored therein a control program executed by the CUP is replaceable. The printer comprises a nonvolatile memory 2 which is capable of being read out and written in and which has contents retained even if a power switch of the printer is turned off. The ROM 1 has stored therein identifying codes 1a for identifying the control program stored in the ROM 1, and initializing data 1b. The nonvolatile memory 2 is provided with memory areas 2a and 2b which have stored respectively therein identifying codes and initializing data similar respectively to the identifying codes 1a and the initializing data 1b stored in the ROM 1. The memory areas 2a and 2b can store the identifying codes 1a and the initializing data 1b, respectively, in an identical array fashion. The printer includes a control unit 3 which compares the identifying codes 1a stored in the ROM 1 with the identifying codes stored in the nonvolatile memory 2 each time the power switch is turned on. When the identifying codes 1a in the ROM 1 and the identifying codes in the nonvolatile memory 2 are inconsistent with each other, the control unit 3 transfers the identifying codes 1a and the initializing data 1b stored in the ROM 1 respectively to the memory areas 2a and 2b of the nonvolatile memory 2, thereby writing the identifying codes 1a and the initializing data 1b respectively to the memory areas 2a and 2b. Thus, even if the ROM 1 is replaced with a new version ROM having incorporated therein new functions, the initializing data 1b in the currently incorporated ROM are always stored in the nonvolatile memory 2. Accordingly, no particular operation is required for initialization of the nonvolatile memory 2. Further, once the nonvolatile memory 2 is initialized, the initialization of the nonvolatile memory 2 is not carried out as far as the ROM 1 is replaced with another one. Thus, after the initialization of the nonvolatile memory 2, it is possible to modify the initializing data in the nonvolatile memory 2 freely from the operation panel or the like in a manner like the conventional one.

Figure 2:
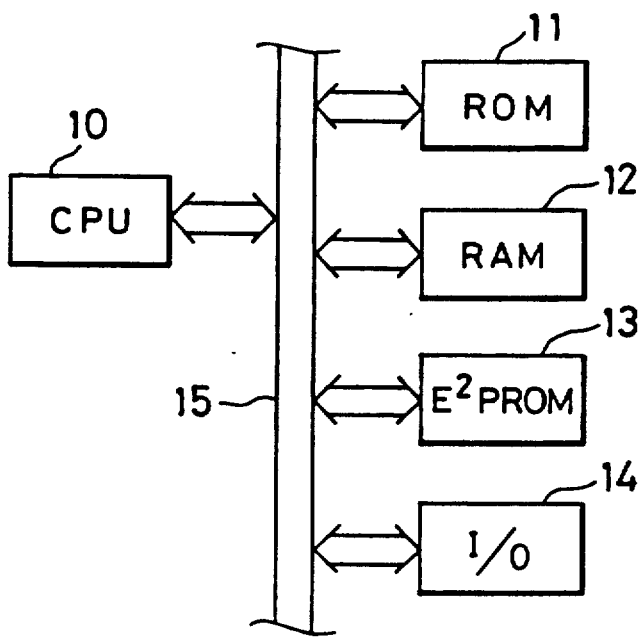
FIG. 2 is a block diagram showing a principal portion of a control system incorporated in a printer according to an embodiment of the invention.

Referring to FIG. 2, there is shown in block diagram a control system incorporated in a printer according to an embodiment of the invention. The control system comprises a CPU (central processing unit) 10 for controlling various functions of the printer. Connected to the CPU 10 through an internal bus 15 consisting of a data bus, an address bus and a control-signal bus are a ROM 11, a RAM (random-access memory) 12, an E²PROM (electrically erasable programmable read-only memory) 13 that is a nonvolatile memory, and an input/output interface 14.

The ROM 11 is mounted to a control board in a replaceable manner. The ROM 11 has stored therein a control program for controlling the CPU 10, identifying codes inclusive of a version number for identifying the control program, and a font of characters to be printed. Further, the ROM 11 has stored therein a program for automatically initializing the E²PROM 13 to be described later, and data for the initialization.

The RAM 12 is utilized to store work areas of the CPU 10, registers, flags and temporarily stored data required for controlling the printer.

The E²PROM 13 has stored therein respective initial states of the various functions of the printer at the time the power switch for the printer is turned on. The E²PROM 13 may be replaced by any nonvolatile memory capable of being read out and written such as a nonvolatile RAM or a RAM backed up by a battery if they can be read out and written by the CPU 10 and can have contents retained even if the power switch is turned off.

The input/output port 14 is connected to various actuators and sensors of the printer.

Figure 3A:
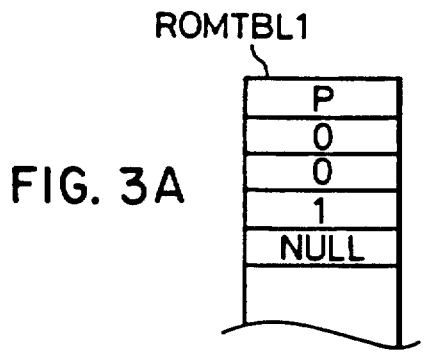
FIGS. 3A-3B together is a view showing an arrangement of data tables provided in a ROM illustrated in FIG. 2.
Figure 3B:
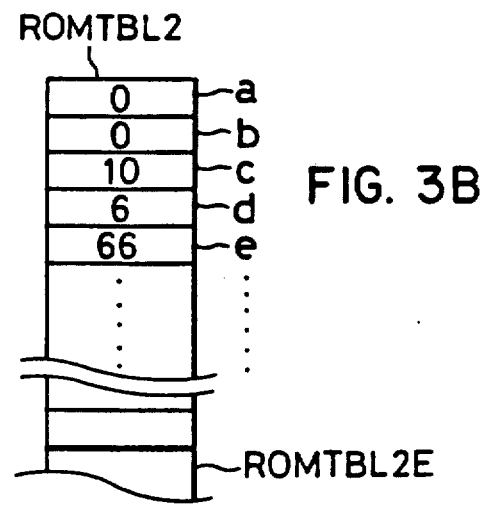

The ROM 11 is provided therein with data tables ROMTBL1 and ROMTBL2 as shown in FIG. 3. The first data table ROMTBL1 has stored therein character-string data as identifying codes indicative of a ROM type and a version number for identifying the control program stored in the ROM 11. The character-string data include a character string "P001", for example, as shown in FIG. 3. A NULL code indicative of termination is stored at the end of the character string. On the other hand, the second data table ROMTBL2 has stored therein data for initializing the E²PROM 13. The data for the initialization includes, for example, data a on the interface to be connected (0: parallel, 1: serial), data b representative of the dot arrangement of characters to be printed (0: draft, 1; high quality), data c on the character pitch (10: 10CPI, 12: 12CPI), data d on the line pitch (6: 6LPI, 8: 8LPI), data e on the paper length (66: 66 lines, 72: 72 lines), and so on.

Figure 4A:
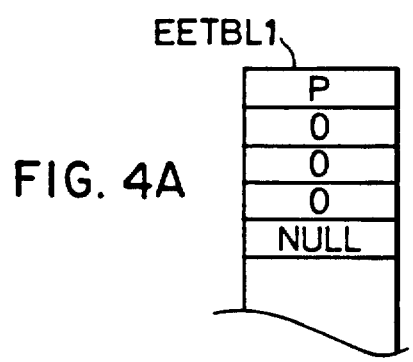
FIGS. 4A-4B together is a view showing an arrangement of data tables provided in an E²PROM illustrated in FIG. 2.
Figure 4B:
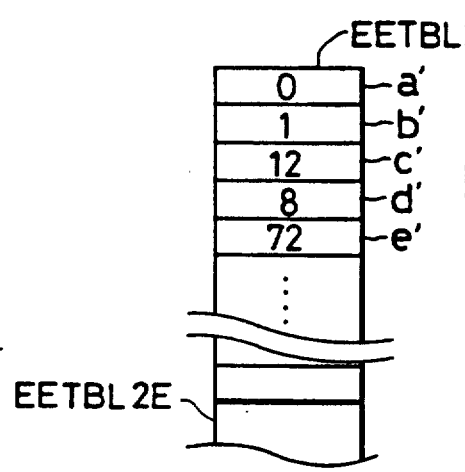

The E²PROM 13 is provided therein with first and second data tables EETBL1 and EETBL2 as shown in FIG. 4. The first data table EETBL1 has stored therein ROM recognition codes and the version number as codes for identifying the control program. The array of the data table EETBL1 is the same as that of the first data table ROMTBL1 in the ROM 11 shown in FIG. 3. On the other hand, the second data table EETBL2 has stored therein data for determining respective initial states of the various functions of the printer at the time the power switch is turned on. The array a', b', c', d', e', ... and the byte number of the second data table EETBL2 are the same as the array a, b, c, d, e, ... and the byte number of the data table ROMTBL2 in the ROM 11 shown in FIG. 3.

Figure 5:
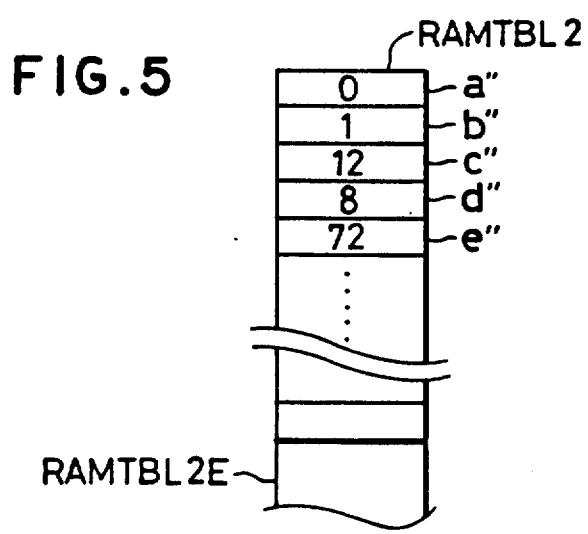
FIG. 5 is a view showing an arrangement of a data table provided in a RAM illustrated in FIG. 2.

The RAM 12 is provided with a data table RAMTBL2 for storing selected modes of the various functions of the printer as shown in FIG. 5. The array a", b", c", d", e", ... of the data table RAMTBL2 is the same as the array a, b, c, d, e, ... of the data table ROMTBL2 and the array a', b', c', d', e', ... of the data table EETBL2. Further, the byte number of the data table ROMTBL2 is also made equal to that of each of the data tables ROMTBL2 and EETBL2.

Figure 6:
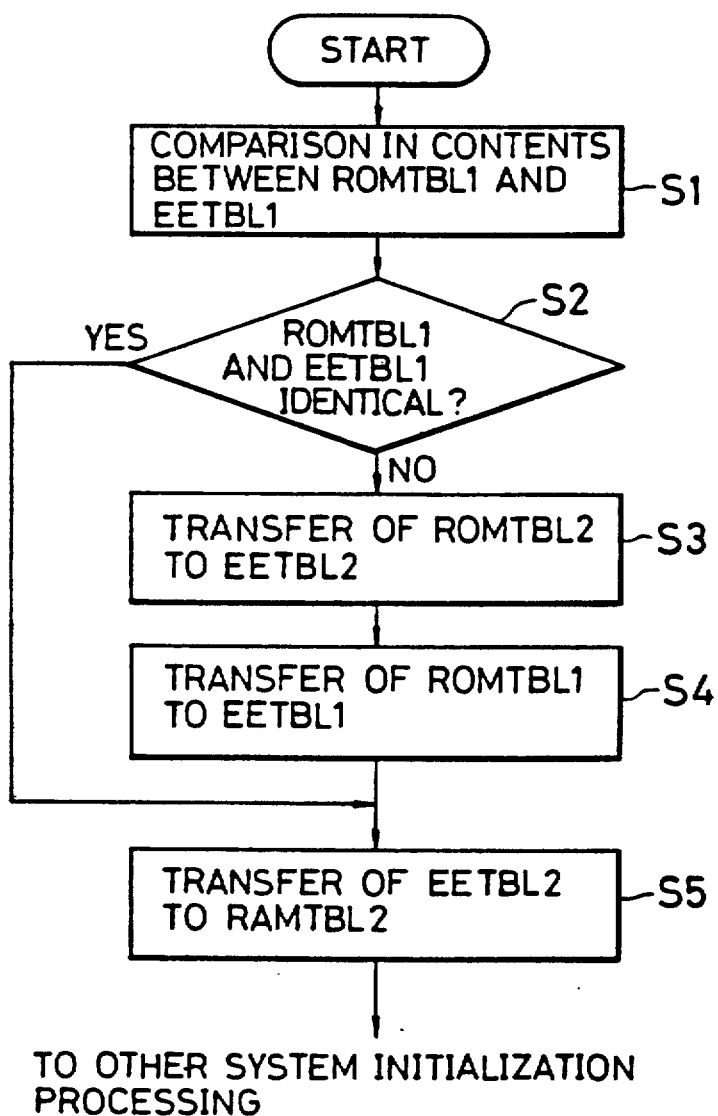
FIG. 6 is a flow chart of an initializing routine executed by a CPU illustrated in FIG. 2.

In the control system constructed as above, the CPU 10 executes a system initializing routine processing as shown in FIG. 6 on the basis of the program stored in the ROM 11 for automatically initializing the E²PROM, each time the power switch of the printer is turned on.

At steps S1 and S2, the CPU 10 first compares the contents of the first data table ROMTBL1 in the ROM 11 with the contents of the first data table EETBL1 in the E²PROM 13. That is, it is judged whether or not the data on the ROM recognition codes and the version number for identifying the control program, stored in the ROM 11 correspond with those stored in the E²PROM 13. If the judgment is affirmative, it is judged that the ROM 11 is the same as one used until now. The program proceeds to a step S5. On the other hand, if the judgment at the step S2 is negative, it is judged that the ROM 11 is replaced by a new one. In this case, the data stored in the second data table ROMTBL2 of the ROM 11, that is, the data for initializing the E²PROM 13 are transferred at a step S3 to the second data table EETBL2 of the E²PROM 13, and are written to the same. By doing so, the E²PROM 13 is initialized. At a subsequent step S4, the data of the first data table ROMTBL1, that are the data on the ROM recognition codes and the version number, are transferred to the first data table EETBL1 of the E²PROM, and are written to the same. As a result, the contents of the ROMTBL1 are made identical with those of the EETBL1, and the contents of the ROMTBL2 are made identical with those of the EETBL2.

At the subsequent step S5, the CPU 10 transfers the contents of the second data table EETBL2 in the E²PROM 13 to the data table RAMTBL2 in the RAM 12. Thus, the initialization processing is completed, and the program proceeds to other system initialization processing or the like.

As described above, the CPU 10 executes the processings at the steps S1, S2, S3, S4 and S5, when the power switch of the printer is first turned on after the ROM 11 having stored therein the control program for the printer has been replaced by new one. On the other hand, when the power switch is merely turned off and subsequently turned on without replacement of the ROM 11, the CPU 10 executes only the processings at the steps S1, S2 and S5, because the contents of the first data table EETBL1 in the E²PROM 13 are the same as those of the first data table ROMTBL1 in the ROM 11.

In the manner described above, the initializing data on the various functions of the printer are copied from the data table ROMTBL2 to the data table EETBL2 of the E²PROM 13 by the initializing processing of the same. Further, the contents of the data table EETBL2 are copied to the data table RAMTBL2 in the RAM 12. The contents of the data table EETBL2 can be modified to ones desired by a user by manipulation of the keys (not shown) in a manner like the conventional one. Moreover, the contents of the data table RAMTBL2 in the RAM 12 can be modified by means of commands from the host computer or by manipulation of the keys. Furthermore, the function selection at the time the printer is operated actually is carried out with reference to the data of the RAMTBL2 in the RAM 12. For instance, if the address b" of the RAMTBL2 is [0], the draft characters are printed, while the address b" is [1], the high-quality characters are printed.

In connection with the above, the control system operates in the manner described above each time the power switch of the printer is turned on. Accordingly, when electric current is caused to first pass through the board to which components are actually mounted, the first data table EETBL1 of the E²PROM 13 is not coincident with the first data table ROMTBL1 of the ROM 11, because the first data table EETBL1 is undefined. Thus, there is a high possibility that the E²PROM 13 is initialized automatically.

What is claimed is:

1. A control system for a printer comprising
a control unit, including a CPU for controlling various functions of the printer;
a replaceable ROM, connected to said control unit, said ROM storing a control program for execution by said CPU, said ROM including a first data table storing first identifying codes for identifying said control program and a second data table storing first initializing data;
a nonvolatile memory, connected to said control unit, to which said control unit can read out data and write in data, said nonvolatile memory retaining its contents even if power is turned off, said nonvolatile memory including a first data table storing second identifying codes similar to said first identifying codes and a second data table storing second initializing data similar to said first initializing data, said second initializing data including respective states of various functions of the printer at time power is turned on, wherein said first and second data tables of said nonvolatile memory are the same in area as said first and second data tables of said ROM, respectively;
said control unit comparing said first and second identifying codes with each other each time power is turned on, said control unit further including judging means for judging whether or not codes in said first data table in said ROM are coincident with those of said first data table of said nonvolatile memory, means, operative in response to a noncoincident judgement by said juding means for transferring the initializing data stored in the second data table of said ROM to said second data table of said nonvolatile memory thereby writing the initializing data stored in said second table of said ROM to said second data table of said nonvolatile memory, and means for transferring the data stored in said first data table of said ROM to said first data table of said nonvolatile memory to write the data stored in said first data table of said ROM to said first data table of said nonvolatile memory.

2. A control system for a printer according to claim 1, further comprising a RAM provided with a data table for storing selected modes of the various functions of the printer, wherein said data table of said RAM is arrayed in a manner corresponding to said second data table of said ROM and said second data table of said nonvolatile memory, and wherein said control unit further includes means for transferring the data of said second data table in said nonvolatile memory to said data table of said RAM.

* * * * *